No. 742,997. Patented November 3, 1903.

UNITED STATES PATENT OFFICE.

CARL JUNG AND ADOLF KITTEL, OF VIENNA, AUSTRIA-HUNGARY, ASSIGNORS OF ONE-THIRD TO ADOLF BRECHER, OF VIENNA, AUSTRIA-HUNGARY.

MANUFACTURE OF ELECTRICAL INSULATING MATERIAL.

SPECIFICATION forming part of Letters Patent No. 742,997, dated November 3, 1903.

Application filed April 21, 1900. Serial No. 13,787. (No specimens.)

*To all whom it may concern:*

Be it known that we, CARL JUNG, residing at 77 Schuttelstrasse, Vienna II, and ADOLF KITTEL, residing at 19 Herthergasse, Vienna V, Austria-Hungary, citizens of the Austro-Hungarian Empire, have invented certain new and useful Improvements in the Manufacture of Electrical Insulating Material; and we do hereby declare the following to be a full, clear, and exact description of the invention, such as will enable others skilled in the art to which it appertains to make and use the same.

Our invention relates to an improved insulating material and to a process of making the same.

Insulating material made in accordance with our invention consists of a mixture of casein and suitable oil. The oil may be used in a crude state or after bleaching the same with sulfuric acid in any well-known way. We have found that the most suitable oils for carrying out our invention are vegetable oils—such, for example, as castor-oil, rapeseed oil, or linseed-oil.

In carrying out our improved process the casein obtained in any well-known way from new milk or skim-milk is first brought into a condition which will permit it to be united with the oil by kneading, whereupon the oil is added and kneaded into the casein, so as to produce an intimate mixture. The mixture thus obtained may be molded under pressure into the desired form and dried. If desired, the said mixture of casein and oil may be united with gutta-percha, caoutchouc, or suitable resinous substances before being pressed into form and dried. Furthermore, to the mixture of casein and oil may be added suitable materials other than the gums or resins in the same way as is done with the usual rubber ware, and, if desired, suitable coloring material may be added to said mixture. Finally, sulfur may be added to the mixture of casein and oil and the compound vulcanized, or sulfur may be added to the mixture of casein and oil with the other ingredients above mentioned and the whole then vulcanized.

The casein and oil mixture is preferably prepared in either one of the following ways, viz: The fresh casein is submitted to a drying process wherein it is reduced to a fine powder and is then mixed with oil in sufficient quantity to bring the whole mass into a doughy condition, whereupon it may be kneaded, or the fresh casein may be submitted to pressure in order to remove the water and then kneaded with oil, or, furthermore, the casein may be dissolved by the use of any suitable solvent, such as alkali or borax, the solution being then evaporated until a thickened doughy mass is obtained, which is kneaded with the oil, as before. As hereinbefore stated, the oil used with the casein may be either raw or bleached with sulfurous acid, and we have found that the oils best adapted for our purpose are castor-oil, rapeseed oil, and linseed-oil.

It will be noted that in all the methods of preparing the casein and oil mixture above referred to the casein is brought to a doughy condition, so that it can be kneaded with the oil. The result is that a thoroughly uniform gelatinous mass is obtained. This gelatinous mass may be then molded under pressure into the desired form and finally dried, or, as has been explained hereinbefore, the said gelatinous mass may be treated as a substitute for rubber and may be mixed with suitable gums or resins or other equivalent materials, singly or combined, and may also be colored, if desired, before being molded and dried. Moreover, before being molded into form the said gelatinous mass or its mixture with any or all of the above-mentioned ingredients may be united with a suitable amount of sulfur, whereby after molding and drying the composition may be vulcanized.

As examples of advantageous compositions, in which our casein and oil mixture are used, we give the following formulæ, the proportions being given by weight.

I. Five parts of raw gum, five parts of the casein and oil mixture, one part of sulfur.

II. Ten parts raw gum, twenty parts of the casein and oil mixture, three parts sulfur, one part linseed-oil.

III. Fifteen parts raw gum, ten parts of the casein and oil mixture, two parts sulfur.

IV. Ten parts raw gum, fifteen parts of the casein and oil mixture, twenty parts pulverized gum-waste, one part pitch, ten parts sulfur, two parts linseed-oil.

The various ingredients of the respective formulæ above given are united by thorough mixing and kneading, and the respective compositions thus obtained may then be brought into suitable form, dried, and vulcanized.

Having thus fully described our invention, what we claim as new, and desire to secure by Letters Patent, is—

1. An insulating material containing a mixture of casein, oil, and sulfur vulcanized.

2. An insulating material containing a mixture of casein, sulfur and bleached vegetable oil vulcanized.

3. An insulating material containing a mixture of casein, oil, sulfur and gum vulcanized.

4. An insulating material containing a mixture of casein, oil, gum or resinous material and sulfur vulcanized.

5. An insulating material containing a mixture of casein, bleached oil, gum or resinous material and sulfur vulcanized.

6. An insulating material containing a mixture of casein, oil, gum or resinous material, sulfur and coloring-matter vulcanized.

7. The process of making insulating material which consists in first producing a doughy mass of casein, then kneading the same with oil, then adding suitable materials thereto, and next molding and drying the mass, and finally vulcanizing it.

8. The process of making insulating material, which consists in first producing a doughy mass of casein, then kneading the same with oil, then adding gum and other suitable materials thereto, next molding and drying the mass, and finally vulcanizing it.

9. The process of making insulating material which consists in producing a doughy mass of casein, then kneading the same with oil, then adding gum or resin and coloring-matter thereto, next molding and drying the mass and finally vulcanizing it.

In testimony whereof we have affixed our signatures in presence of two witnesses.

CARL JUNG.
ADOLF KITTEL.

Witnesses:
ALVESTO S. HOGUE,
C. F. HIRST.